United States Patent [19]
Dietrich, Sr.

[11] 3,736,029
[45] May 29, 1973

[54] ATTACHABLE DUAL DRIVE WHEEL
[75] Inventor: William J. Dietrich, Sr., Goodfield, Ill.
[73] Assignee: Dietrich Manufacturing, Inc., Goodfield, Ill.
[22] Filed: Apr. 13, 1971
[21] Appl. No.: 133,674

[52] U.S. Cl. ............................................. 301/39 R
[51] Int. Cl. ........................................... B60b 11/06
[58] Field of Search ................ 301/39 R, 39 C, 36 R, 301/40 S

[56] References Cited
UNITED STATES PATENTS

| 3,223,455 | 12/1965 | Hammer | 301/39 R |
| 3,337,270 | 8/1967 | Peterson | 301/39 R |
| 3,359,039 | 12/1967 | Theissen | 301/39 R |
| 3,583,767 | 7/1971 | Unverferth | 301/39 R |
| 3,048,443 | 8/1962 | O'Donnell | 301/9 TV |

Primary Examiner—Richard J. Johnson
Attorney—Dawson, Tilton, Fallon & Lungmus

[57] ABSTRACT

A dual wheel is secured to a drive wheel of a traction vehicle by means of a plurality of bolt fasteners. The bolt fasteners are secured to the rim of the dual wheel by means of removable anchor lugs. The anchor lugs are attachable at predetermined locations about the dual wheel rim and these locations have a different angular spacing than the pivotal attachment of the bolt fasteners to the drive wheel rim so that some of the bolt fasteners are forwardly inclined and some are rearwardly inclined relative to a line parallel to the drive axis. Thus, some of the bolt fasteners will always be in tension when the drive is reversed, and slip between the two wheels is minimized.

6 Claims, 6 Drawing Figures

Patented May 29, 1973 3,736,029
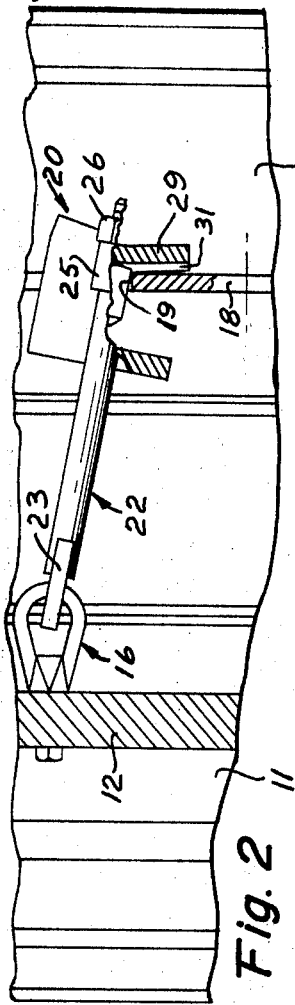
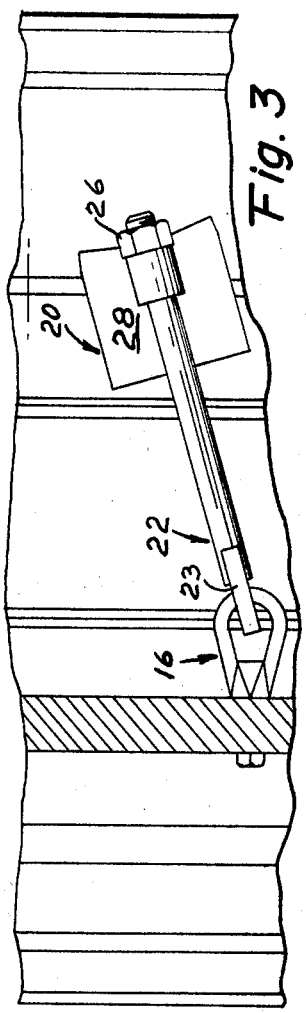
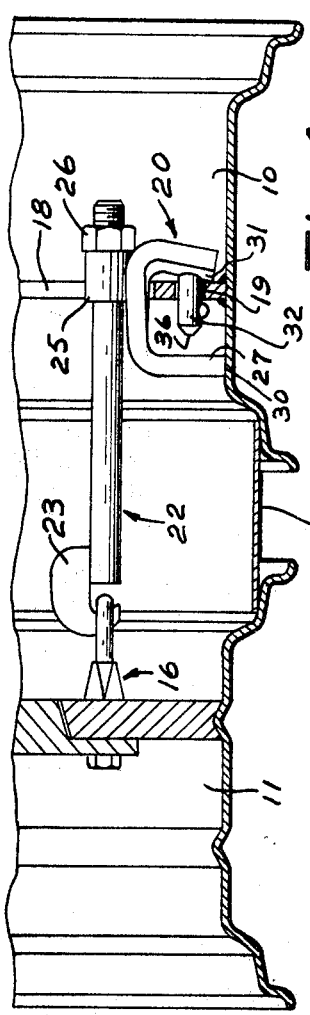
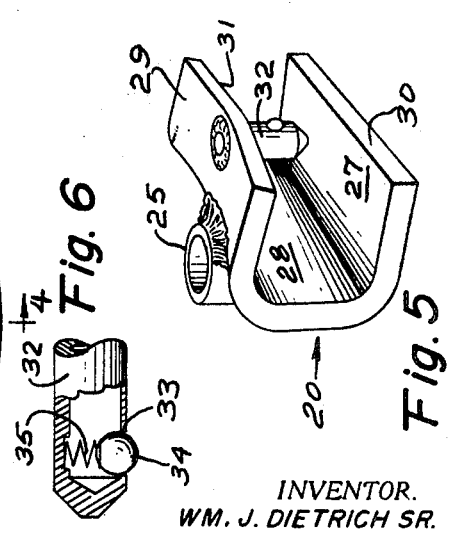
INVENTOR.
WM. J. DIETRICH SR.
BY Dawson, Tilton,
Fallon & Lungmus
Attys.

ATTACHABLE DUAL DRIVE WHEEL

BACKGROUND OF THE INVENTION

1. Field of the Invention

The present invention relates to apparatus for securing an additional wheel to a drive wheel of a traction vehicle in order to provide additional traction.

2. Known Constructions

One dual wheel assembly currently in commercial use includes a curved track on the interior of the rim of the auxiliary wheel. The track includes a free edge extending away from the regular drive wheel and the rim is parallel to the axis of rotation of the wheels. Slotted U-shaped brackets are slidably mounted by means of their slots on the outward free edge of the track. The brackets are moved to position of alignment with existing attaching means of the regular drive wheel, and fastener bolts hold the two rims together.

With the fastener bolts all extending parallel to one another and to the drive axis, there is a tendency to cause the dual wheel to lag behind the drive wheel under traction. As the drive is reversed during normal use of the vehicle, the lag between drive wheel and the dual wheel is reversed in direction, and with continued reversing, the means securing the dual wheel to the drive wheel has a tendency to become loose. If the fasteners do become loose, there can be a slip between the two rims during reversing, resulting in wrenching of the attachment means on the dual wheel rim.

SUMMARY

The present invention includes a number of removable anchor lugs which are attachable to the dual wheel rim only at discrete locations. These discrete locations for attachment of the anchor lugs are spaced about the dual wheel rim at a different angular spacing than the base of the bolt fasteners that hold the two rims together. When fastening the dual rim to the rim of the drive wheel, there need be no alignment between the two, because it is desired that the bolt fasteners be skewed relative to the drive axis, not parallel with it. That is, some of the bolt fasteners will be inclined forwardly and some rearwardly with respect to a line parallel to the drive axis.

With some of the bolt fasteners forwardly inclined and others rearwardly inclined, at least some of the fasteners will be in tension when the drive is reversed, and slip between the two wheels is thereby practically eliminated.

Each of the anchor lugs which attach to the dual rim is provided with a first curved bearing surface to accommodate the inclination of the fastening bolts relative to the drive axis; and each anchor lug is further provided with a bearing surface which engages the dual rim at a location between the flange and the drive wheel, thus relieving any bending moment which would otherwise be applied to the flange to twist it.

The present invention, therefore, provides for apparatus for attaching a dual wheel to the drive wheel of a traction vehicle without having to align the rim of the dual wheel with the main drive rim, and, at the same time, allowing some of the bolt fasteners to be forwardly inclined relative to the drive axis and some to be rearwardly inclined to provide a positive drive to the dual wheel whether the drive wheel is being driven forward or in reverse. In addition, the construction of the anchor lugs is such as to relieve stress on the seating flange of the dual rim while permitting alignment of the anchor lugs relative to the axis of its attaching bolt fastener.

Other features and advantages of the present invention will be apparent to persons skilled in the art from the following detailed description of the preferred embodiment accompanied by the attached drawing wherein identical reference numerals will refer to like parts in the various views.

THE DRAWING

FIG. 1 is a side elevational view of a dual wheel rim incorporating the present invention and diagrammatically illustrating the skewed placement of certain of the bolt fasteners;

FIGS. 2 and 3 are plan views of fastening means according to the present invention with bolt fasteners inclined respectively rearwardly and forwardly;

FIG. 4 is a rear view of a fastener mechanism incorporating the present invention;

FIG. 5 is a perspective view of a removable anchor lug according to the present invention; and FIG. 6 is an enlarged detailed view of the inserter pin, partially broken away, of the lug of FIG. 5.

DETAILED DESCRIPTION

Turning first to FIG. 1, reference numeral 10 generally designates a dual wheel rim, and it is located between the viewer and a rim 11 of a traction vehicle, sometimes referred to as the rim of the drive wheel. The rim 11 includes the spoke section 12 connecting with a central hub 13 which secures to a drive axis 14 of the vehicle.

As best seen in FIG. 4, a cylindrical spacer member 15 is located between corresponding shoulders formed in the rims 10 and 11 to hold the rims apart at a distance sufficient to avoid interference between adjacent side surfaces of the tires attached to the rims (not shown). The rim 11 is provided with a number (8 in the illustration) of eye bolts which are spaced at equal angular increments about the center of the shaft 14 and at equal radial distances therefrom. The eye bolts are generally designated 16 in FIGS. 2–4, and their locations are designated 17 in FIG. 1.

An annular flange 18 is welded to the interior of the auxiliary rim 10, and it extends generally in a plane perpendicular to the drive axis (that is, the axis of rotation of the rims 10 and 11). The rim 18 is provided with a plurality of apertures 19 which are spaced about at equal angular increments, but the angular separation between the holes 19 of the rim 18 is different than the angular increments between the holes 17 of the main rim 11. Thus, at least some of the holes 19 in the flange 18 of the auxiliary rim are offset with respect to corresponding locations of the eye bolts 16 in the main rim 11. In the illustration of FIG. 1, there are many more of the holes 19 than there are eye bolts on the main rim; however, this is not essential to the useful operation of the invention.

The holes 19 on the flange 18 provide locations at which anchor lugs, generally designated 20, may be placed on the auxiliary rim 10, adjacent a corresponding eye bolt 16. It will be observed from the FIG. 1 that some of the apertures 19 on the flange 18 are in front of (that is, as viewed from the drive axis) their associated eye bolt locations 17, some of the apertures 19 are behind their associated eye bolt locations, and two of the 33 apertures (namely, the ones at the top and bottom of FIG. 1) line up with their associated eye bolt locations.

Turning now to FIGS. 2–4, a fastening bolt generally designated 22 is provided for each of the eye bolts 16, and each fastening bolt 22 includes a hook portion 23 for coupling with an associated eye bolt. The other end of each fastening bolt is threaded, and after passing through a sleeve 25 on its associated anchor lug 20, a nut 26 is secured onto the shaft of the bolt fastener 22 to draw the auxiliary rim 10 against the main rim 11.

Turning now to FIG. 5, which shows the underside of one of the anchor lugs 20, the sleeve 25 is a cylindrical member which is welded to the top of the lug. The lug has the general shape of a saddle, including a first side wall 27, an upper wall 28, and a second side wall 29. The side wall 27 may be generally straight, and it includes a lower bearing surface 30. The side wall 29, however, is curved inwardly at its center so as to form a very broad V-shape when viewed from the bottom. The inner surface of the lower edge of the side wall 29 is designated by reference numeral 31, and it forms a bearing surface for engaging the seating flange 18. Extending inwardly from the depressed center of the side wall 29 is a pin 32. Turning now to FIG. 6, adjacent the inner edge of the pin 32, there is formed an aperture 33 which acts as a seat for a ball 34. A spring 35 holds the ball 34 against the seat 33 in resilient fashion. The pin 32 is adapted to be received in one of the apertures 19 of the seating flange 18, and it has an outer diameter slightly less than the inner diameter of the holes 19 so that when the pin 32 is placed into an associated aperture, the ball 34 will be depressed and, after passing through the aperture, will be forced outwardly by the spring 35 to act as a retainer means for the anchor lug.

Turning now to FIG. 2, the action of the V-shaped bearing surface 31 is illustrated. Actually, any convex bearing surface will work, the function of this bearing surface being to permit the anchor lug 20 to be inclined or skewed relative to the drive axis to permit the axis of sleeve 25 to become aligned with the axis of the shaft of the bolt fastener 22 to receive the same while still affording a bearing surface against the seating flange 18.

As seen in FIG. 2, the bolt fastener 22 is inclined rearwardly relative to its associated eye bolt; whereas in FIG. 3, the bolt fastener is inclined forwardly relative to its associated eye bolt. It is a principal object of the present invention that some of the eye bolts be forwardly inclined and others be rearwardly inclined so that when the drive of the main wheel is reversed, at least some of the bolt fasteners will always be in tension to thereby provide positive traction to the auxiliary wheel and prevent slippage between the two wheels.

Turning now to FIG. 4, the innermost end 36 of the pin 32 is spaced from the wall 27 of the anchor lug 20 by a distance larger than the width of the seating or retaining flange 18 to permit the lug to be assembled onto and removed from that flange. When the lug is assembled to the flange 18, however, and the bolt fastener 22 is received in the sleeve 25, the lower bearing surface 30 of the lug wall 27 engages the rim 10. This acts to relieve bending stress that would otherwise be applied to the flange 18 because the pulling force is transmitted from the bearing surface 31 of the lug 20 at a location adjacent the interconnection between the flange 18 and the rim 10, through the body of the lug 20 and onto the bearing surface 30. This is considered another important feature of the invention because, despite the disposition of the anchor lug 20 in its alignment with an associated bolt fastener 22, there is no twisting force on the flange 18 to twist it out of its planar alignment, nor is there any large twisting moment tending to bend the flange toward the main wheel 18 despite the fact that this flange serves as a reaction base for holding two rims together.

Turning again to FIG. 1, the retaining flange 18 is preferably secured to the rim 10 by means of a plurality of discrete, heavy welds, as at 39, each located adjacent one of the apertures 19 in the flange. By this means, greater retaining strength is achieved for the same amount of welding because the weld points are located so as to resist the holding force immediately adjacent the point of application of that force.

ASSEMBLY

In assembling an auxiliary wheel to a main drive wheel, the rims may be placed in abutting arrangement with a spacer member 15 without regard for alignment between the eye bolts on the main rim 11 and the apertures in the flange 18 of the auxiliary rim 10. Each of the anchor lugs 20 may be pulled outwardly to disengage the pin 32 from its associated aperture 19 to move the lug adjacent one of the bolt fasteners 22. Preferably, some of the lugs 20 will be spaced in apertures 19 located forwardly of their associated bolt fastener, and some of the lugs will be spaced rearwardly relative to their associated bolt fasteners. As mentioned, the words "forwardly" and "rearwardly" are taken in the sense of viewing from the axis of rotation of the shaft 14.

The threaded end of a bolt fastener is then placed through one of the sleeves 25 on an associated anchor lug, and a nut 26 is tightened down onto the shaft of the bolt fastener.

Means other than the spring-held ball may be used to hold a loose anchor lug in releasable engagement with a hole 19 in the flange 18, for example, a depressible band spring could be located on the inner side of the rear wall 27 of the lug 20 to engage the opposing surface of the flange 18.

One of the important functions of the lug 20 is to line up with the axis of the bolt fastener so as to avoid any undue stress points no matter what the angular disposition of the bolt. An alternative to the structure shown that might equally well be employed is a U-shaped lug with a sleeve which is pivotally mounted as by a swivel joint, to the back of the lug. Thus, the sleeve which receives the bolt, and not the lug itself, would adjust to the disposition of the bolt when fastened to it. However, the embodiment illustrated is preferred because the slight U-shape of the wall 29 also adds resistance to bending of that wall by the applied forces when the dual wheel is in operation.

Having thus described in detail a preferred embodiment of my invention, persons skilled in the art will be able to modify certain of the structure which has been illustrated and to substitute equivalent elements for those which have been disclosed; and it is, therefore, intended that all such modifications and substitutions be covered as they are embraced within the spirit and scope of the appended claims.

I claim:

1. In a system for securing a rim of an auxiliary wheel to a rim of a drive wheel of a traction vehicle, the combination comprising an annular flange secured to and extending radially inwardly of said auxiliary wheel rim and providing a plurality of apertures; and a plurality of anchor lugs removably attachable to said flange by means of said apertures, each anchor lug being in the form of a saddle with two depending side walls, one adapted to engage said auxiliary wheel rim at a position intermediate said flange and said drive wheel rim, and the other depending side wall of said anchor member extending on the other side of said flange and bearing against said flange at a location between an associated aperture and said auxiliary wheel when said anchor means is in assembled relation with said flange.

2. In a system for securing a rim of an auxiliary wheel to a rim of a drive wheel of a traction vehicle wherein said drive wheel is provided with a plurality of bolt fasteners, each pivotally connected to said auxiliary wheel rim at locations spaced equally from the drive axis of said rim and at equal angular displacements about said rim, the improvement comprising: a retainer flange secured to said auxiliary wheel rim and extending inwardly thereof in a plane perpendicular to said drive axis, said retainer flange defining a plurality of apertures, at least some of said apertures being offset relative to the points of location of said bolt fasteners to said drive wheel rim; an anchor lug for each of said fastener means and adapted to be secured to the distal end thereof, each anchor lug including means for releasably attaching to said retainer flange at one of said apertures and including a curved bearing surface for engaging the surface of said retainer flange remote from said drive wheel rim when said rims are assembled together, said curved bearing surface permitting alignment of said lug with an associated bolt fastener when tension is applied to secure said fastener to said lug.

3. The system of claim 2 wherein each lug further comprises a cylindrical sleeve for receiving an associated bolt fastener, an upper wall located centrally of said flange and crossing thereover, and a rear wall depending from said upper wall between said flange and said drive wheel rim, said rear wall including a lower bearing surface engaging the rim of said auxiliary wheel to brace said lug against the tension of said bolt by applying a force radially to said rim.

4. A system for securing a rim of an auxiliary wheel to a rim of a drive wheel of a traction vehicle comprising: a plurality of bolt fastener means each having one end pivotally secured to a base location on said drive wheel rim; a plurality of locating means on said auxiliary wheel rim, some of said locating means being fixed in a clockwise direction and others of said locating means being fixed in a counter-clockwise direction relative to the base location of their associated fastener means when said rims are brought together in assembled relation; and a plurality of anchor means removably attached to associated ones of said locating means on said auxiliary wheel rim, each anchor means securing the distal end of an associated fastener means to draw said rims together, whereby when said auxiliary wheel rim is assembled to said drive wheel rim, one set of said bolt fastener means will be inclined in a clockwise direction and another set will be inclined in a counterclockwise direction so that at least one set of said fastener means will be in tension regardless of the direction of drive.

5. The system of claim 4 wherein said locating means comprises an annular retainer flange secured to said auxiliary wheel rim and providing a first and a second set of apertures located respectively in a clockwise and a counterclockwise direction relative to the base location of their associated fastener means; and wherein said anchor means comprises an anchor lug for each of said fastener means, each anchor lug including a pin receivable in an associated aperture of said flange, and a bearing surface curved outwardly about a radial line of said wheel and located on the side of said flange remote from said drive wheel rim and located between an associated aperture of said flange and the rim of said auxiliary wheel whereby said curved bearing surface of each anchor lug engages the outer surface of said flange adjacent said auxiliary rim and permits alignment of said lug with an associated fastener means when tensioned thereto.

6. The system of claim 5 wherein each of said lugs is generally saddle-shaped, having first and second generally parallel walls and an inter-connecting top wall, said second wall being provided with an inwardly extending pin for fitting through an aperture in said retainer flange and a convexly curved bearing surface for engaging said flange between an aperture and the rim of said auxiliary wheel, said first wall further providing a bearing surface engaging the rim of said auxiliary wheel between said retainer flange and the drive wheel whereby force will be transmitted directly to said rim through said bearing surfaces.

\* \* \* \* \*